United States Patent
Gregus-Kollár et al.

(10) Patent No.: US 12,313,353 B2
(45) Date of Patent: May 27, 2025

(54) COLLECTOR OF A HEAT EXCHANGER FOR A VEHICLE AND SUCH A HEAT EXCHANGER

(71) Applicant: Hanon Systems, Daejeon (KR)

(72) Inventors: Ján Gregus-Kollár, Skalica (SK); Martin Janský, Luhacovice (CZ); Jan Lazek, Ostrozská Nová Ves (CZ); Leo Somhorst, Chislehurst (GB); Jan Povýsil, Prerov (CZ); Jakub Sagacík, Valasské Mezirici (CZ); Marek Bursik, Nový Jicin (CZ)

(73) Assignee: HANON SYSTEMS, Daejeon (KR)

( * ) Notice: Subject to any disclaimer, the term of this patent is extended or adjusted under 35 U.S.C. 154(b) by 53 days.

(21) Appl. No.: 17/756,136

(22) PCT Filed: Feb. 26, 2021

(86) PCT No.: PCT/KR2021/002438
§ 371 (c)(1),
(2) Date: May 18, 2022

(87) PCT Pub. No.: WO2021/182780
PCT Pub. Date: Sep. 16, 2021

(65) Prior Publication Data
US 2022/0412673 A1 Dec. 29, 2022

(30) Foreign Application Priority Data
Mar. 9, 2020 (DE) ...................... 10 2020 202 962.8

(51) Int. Cl.
*F28F 9/02* (2006.01)

(52) U.S. Cl.
CPC ..................................... *F28F 9/02* (2013.01)

(58) Field of Classification Search
CPC ......................................................... F28F 9/02
USPC .......................................................... 165/175
See application file for complete search history.

(56) References Cited

U.S. PATENT DOCUMENTS

| 4,881,595 A | 11/1989 | Damsohn et al. |
| 2009/0095458 A1 | 4/2009 | Lim et al. |

FOREIGN PATENT DOCUMENTS

| DE | 102018109233 A1 | 10/2019 |
| FR | 2712384 B1 | 10/1996 |
| JP | 2015087055 A | 5/2015 |
| JP | 2019060569 A | 4/2019 |
| JP | 6551293 B2 | 7/2019 |
| KR | 20070081328 A | 8/2007 |
| KR | 101960804 B1 | 3/2019 |

(Continued)

*Primary Examiner* — Davis D Hwu
(74) *Attorney, Agent, or Firm* — Shumaker, Loop & Kendrick, LLP; James D. Miller

(57) ABSTRACT

A collector of a heat exchanger for a vehicle, which collector has numerous recesses for projections on a tube sheet that are pressed into the recesses as part of a crimp connection, and wherein the recesses have at least one platform which is spaced apart from at least one edge of the recess in such a way that a free space is created. A heat exchanger for a vehicle, which heat exchanger has a tube sheet with projections that adjoin openings and are pressed into recesses of a collector, and wherein at least one opening edge, which is adjacent to an opening edge that is directly adjacent to the projection, is bent out of the plane of the opening.

10 Claims, 2 Drawing Sheets

(56) References Cited

FOREIGN PATENT DOCUMENTS

KR      20200020794 A     2/2020
WO    WO2011120977 A2 * 10/2011

* cited by examiner

COLLECTOR OF A HEAT EXCHANGER FOR A VEHICLE AND SUCH A HEAT EXCHANGER

CROSS REFERENCE TO RELATED APPLICATIONS

This is a U.S. national phase patent application of PCT/KR2021/002438 filed Feb. 26, 2021 which claims the benefit of and priority to German Pat. Appl. No. 10 2020 202 962.8 filed on Mar. 9, 2020, the entire contents of each of which are incorporated herein by reference.

TECHNICAL FIELD

The invention relates to a collector of a heat exchanger for a vehicle and to such a heat exchanger.

In heat exchangers which have numerous parallel tubes through which a fluid flows, the connection between the collector and a tube sheet is often a critical point. The tube sheet typically has numerous openings into which the numerous parallel tubes open. The fluid can be air, for example, that is cooled in the heat exchanger, which then acts as a charge air cooler. The tubes described open into a space formed by the tube sheet and the collector such that the air is "collected" there.

Alternatively, in heat exchangers which have numerous plates, a header or head plate is provided between the collector and the plates. The plates, between which a fluid flows, are not necessarily connected to the header. It should already be mentioned at this point that the invention can also be applied to such a header or head plate and that, at all places where a tube sheet is mentioned, a header or head plate is equally meant.

The collector and tube sheet are usually connected by means of a crimp connection, in which portions of the tube sheet are pressed into recesses in the collector. The described crimp connection can constitute a weak point since the pressure of charge air, for example, increases with the further development of engines, and since it is moreover considered to integrate the charge air cooler into the air diffuser as a structural element. This also leads to greater strains on the crimp connections.

BACKGROUND ART

A currently common collector 10 is shown in FIG. 7, which has recesses 12 into which projections 14 formed on a tube sheet 16 (cf. FIG. 8) are pressed. This is in particular the case for numerous projections 14 along the collector 10, as is apparent from the numerous recesses 12 depicted from left to right in FIG. 7.

It is apparent from FIG. 8 that an upper (as according to the figure) opening edge 26, which is directly adjacent to projection 14, is deformed as a result of the crimp connection. This is not the case, however, for the opening edges 24 adjacent thereto. It should additionally be noted that the described opening edges 24, 26, together with an opening edge which is essentially parallel to the opening edge 26, delimit an opening 22. The opening edges 24 extend essentially parallel to a direction in which the collector 10 and the tube sheet 16 are joined before being connected by means of crimp connections (in FIG. 7, essentially from top to bottom).

SUMMARY

As is apparent from FIG. 9, in particular the transition, or the corner, between the respective opening edge 24 and opening edge 26 represents a position at which stress peaks occur as a result of the extensive deformation, such that there is a risk of breakage.

Against this background, the object of the invention is to provide a collector and a heat exchanger provided with said collector which are improved with regard to the durability and security of the connection to a tube sheet.

The object is first of all solved by the collector described and shown herein.

This collector, as already described above in connection with the prior art, has numerous recesses into which the projections provided on the tube sheet are pressed as part of a crimp connection. It should be noted at this point that, unless it is clear from the following explanations how the invention differs from the prior art, all of the explanations given above in relation to the prior art also apply to the subject matter of the invention.

The difference lies in particular in that the described recesses have at least one platform which is spaced apart from at least one edge of the recess in such a way that a free space is created. This free space essentially enables the projections or the so-called band of the tube sheet, on which the projections and the openings are formed, to be more extensively deformed and pressed into the recesses of the collector. As explained in more detail below in connection with the tube sheet, this deformation also occurs in particular in the region of the opening edges which are adjacent to the opening edge that is directly adjacent to the projection. In this way, the point described above in connection with the prior art at the respective transition between said opening edges can be avoided so that stress peaks in this region can be significantly reduced and a weak point is avoided. By deforming the opening edges more extensively, the radii of curvature can therefore be increased, which contributes to reducing stress peaks.

For the deformation in the region of the opening edges which are formed parallel to the above-mentioned joining direction, the free space described above in connection with the collector is used in an advantageous manner. Furthermore, a better joining of the tube sheet to the collector can be achieved by deforming the opening edges extending parallel to the joining direction since, in a way, the portions surrounding the respective opening in the tube sheet can be pressed into the recesses of the collector in a particularly extensive and thus close-fitting manner. At the same time, the opening edge which is directly adjacent to the projection reliably abuts the platform provided in the recess. This abutting is achieved in particular over a comparatively large surface area. With regard to reducing the stress peaks, a first investigation showed that, in the configuration according to the invention, the maximum stress could be reduced by approximately 30% as compared to the prior art. This is also true in particular for a sheet thickness of the tube sheet material corresponding to that of the prior art.

In particular with regard to further increasing the contact area between the projection of the tube sheet and the platform formed in the collector, it has proven advantageous for at least one platform, preferably for all of the platforms in all recesses, to overhang the lateral edge of the collector or protrude beyond it.

For stability and a tight-fitting connection between the tube sheet or header and the collector, it has also proven advantageous for the recess to be formed so as to rise next to the platform in the direction of the level of the platform.

The same is equally true for the lateral edge or the lateral edges of the recess next to the platform or next to the free space, which are preferably formed in a curved manner.

As already pointed out above, the invention also manifests itself in a heat exchanger with a tube sheet which has projections that adjoin openings and are pressed into recesses of the collector. According to the invention, at least one opening edge, which is adjacent to an opening edge that is directly adjacent to the projection, is bent out of the plane of the opening. These opening edges, which, as compared to the prior art, are additionally bent out, are the ones that extend essentially parallel to the joining direction between the collector and the tube sheet when these two elements are joined prior to forming the crimp connection.

To further improve the fixed connection between the collector and the tube sheet, it has proven advantageous for a further projection each to be formed between the respective projections adjacent to an opening and to be pressed into a further recess of the collector.

In this regard, in order to form the further projections, it is currently preferred that the edge of the tube sheet or header directed towards the collector be cut in, deepened or recessed next to the further projections.

With respect to the configuration of the opening, it is preferred that the opening edges which are to be deformed according to the invention and which are adjacent to an opening edge that is directly adjacent to the projection extend essentially parallel to each other.

Finally, for a configuration of the tube sheet or header that has a particularly low susceptibility to cracking, it is preferred that the edge thereof which is directed towards the collector be designed in a serpentine or undulating manner when viewed in the direction of the plane of the openings.

Lastly, it should be noted that the last described configuration of the tube sheet with the opening edges deformed in a novel manner also works, in principle, with any collector configuration, but it is preferred, however, that the tube sheet according to the invention is combined with the collector according to the invention, as described at the start.

BRIEF DESCRIPTION OF DRAWINGS

In the following, the invention is explained in more detail by reference to exemplary embodiments depicted in the drawings. The drawings show the following.

DESCRIPTION OF AN EMBODIMENT

Figure 1:
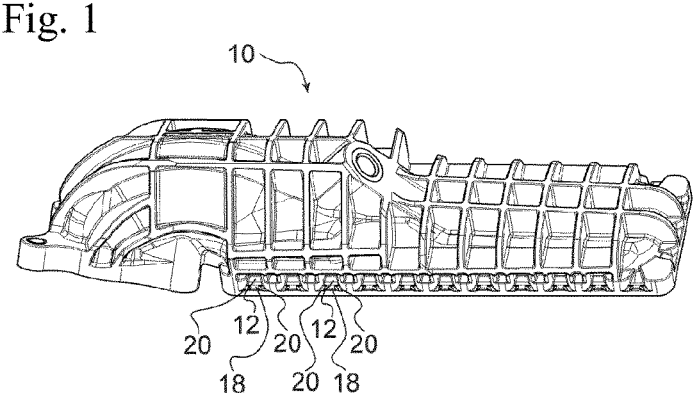
FIG. 1 a perspective view of the collector according to the invention.

As is apparent from FIG. 1, in the shown exemplary case of a heat exchanger with numerous tubes, the collector 10 is essentially elongated and, in the right-hand region thereof according to the orientation of FIG. 1, numerous tubes, in particular flat tubes, which extend essentially vertically according to FIG. 1 would open into the collector. In the left-hand region of the collector, a connection to surrounding components is provided. As is apparent in the lower right-hand region of FIG. 1 and, in more detail, in FIG. 3, the collector has numerous recesses 12 for connecting with a tube sheet, the recesses being laterally delimited (according to FIG. 1 on the left and right) by walls extending in a curved manner. According to the invention, a platform 18 is provided at the outer edge (at the front according to FIG. 1) and at the respective lower edge of each recess 12, which platform 18 is spaced apart from the left and right edges of the recess 12 in such a way that a free space 20 is formed there in each case. As already mentioned, this free space 20 can be used advantageously so that the opening edges 24 (cf. FIG. 4) extending essentially parallel to the joining direction (in FIG. 1 from top to bottom) can be advantageously deformed and can be pressed into said free spaces 20. With regard to the embodiment of FIG. 1, it should be mentioned that the platforms 18 do not overhang the lateral edge of the collector 10, which is also apparent in FIG. 2.

Figure 2:
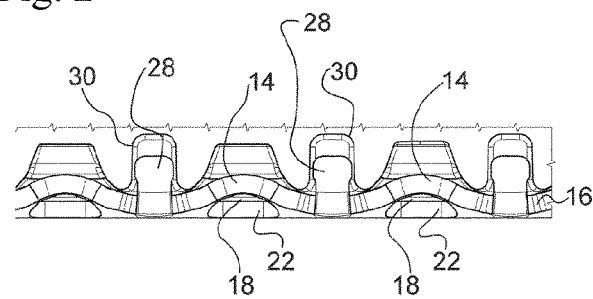
FIG. 2 a plan view of a portion of the collector according to the invention and a tube sheet connected thereto.

The contour of the collector 10, which is essentially serpentine in the plan view, is furthermore apparent in FIG. 2, viewed in the direction of the plane of openings (22), this contour resulting from the fact that the region of the so-called band, which comprises the projections 14 and the openings 22 (cf. FIGS. 4 and 5), is deformed essentially in the described serpentine form.

In FIG. 2, a preferred measure is additionally apparent, according to which further projections 28, essentially having the form of lugs, are formed between each of the projections 14 of the tube sheet 16 that are adjacent to openings 22 of the tube sheet. These further projections 28 are pressed into further recesses 30 of the collector that are provided for this purpose, and improve the connection between the collector 10 and tube sheet 16 with regard to the strength. In order to enable the required deformations, said band is cut in, deepened or recessed between each of the lugs and projections.

The respective platforms 18 and the free spaces 20 created thereby are more clearly apparent in FIG. 3. The same is true of the lateral walls of the recess 12 which, in the example shown, extend in such a curved manner that the recess widens in the direction of the described band of the tube sheet 16 (downwards according to FIG. 2). The recess 12 with the free spaces 20 provided, in a way, next to the platform 18 can be described, in the side view (see also FIG. 1), as having an inverted U-shape. Furthermore, the lower edge of the respective recess 12 rises next to the platform 18.

Figure 3A:
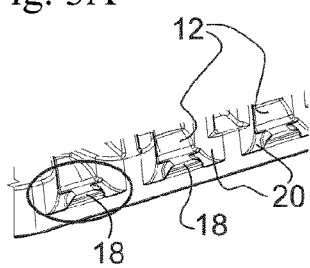
FIG. 3A a perspective view of a section of the collector according to FIG. 1 in a second embodiment.

In FIG. 3A, a preferred embodiment of the platforms is furthermore shown in such a way that they overhang the lateral opening edge of the collector 10, so that the contact area with the opening edge of collector 10 is further increased. It should be mentioned here that this is depicted better in FIG. 6.

Figure 3B:
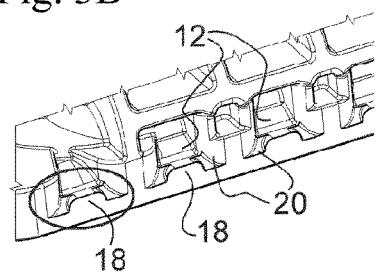
FIG. 3B a perspective view of a section of the collector according to FIG. 1.

In FIG. 3B, in accordance with FIG. 3A, a portion of the collector shown in FIG. 1 is depicted, in which the platforms do not protrude from the edge of the collector.

Figure 4:
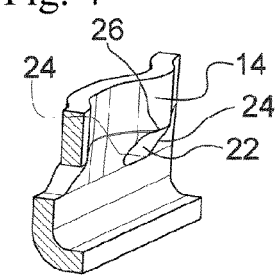
FIG. 4 a perspective view of a portion of the tube sheet according to the invention.
Figure 8:
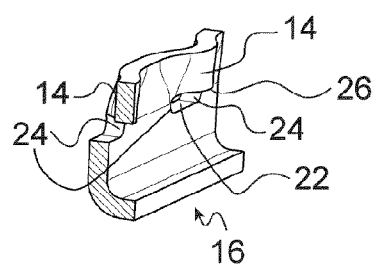
FIG. 8 a view corresponding to FIG. 4 of the tube sheet according to the prior art.
Figure 9:
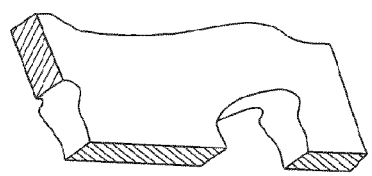
FIG. 9 a perspective view of a section of FIG. 8.

It is apparent from FIG. 4, in particular in comparison with FIG. 8, that, according to the invention, not only the actual projection 14 and the opening edge 26 directly adjacent thereto are deformed, but also the opening edges 24 adjacent to this opening edge 26, such that, as described above, the dangerous stress peaks can be avoided. In the case shown, the deformation essentially ends at the opening edge opposite to the opening edge 26.

Figure 5:
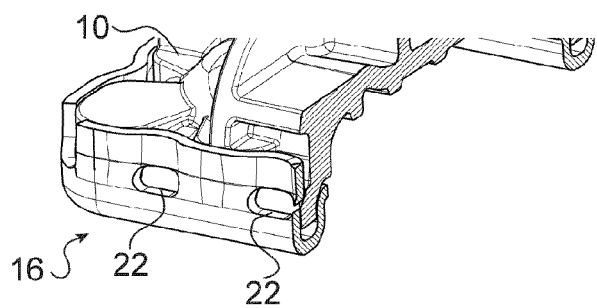
FIG. 5 a perspective view of the collector according to the invention and the tube sheet connected thereto.

FIG. 5 additionally shows a portion of the collector 10 with the tube sheet 16 attached thereto, which is deformed according to FIG. 4 in the region essential for the invention.

Figure 6:
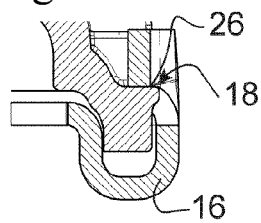
FIG. 6 a sectional view of the tube sheet connected to the collector according to the embodiment from FIG. 3.
Figure 7:
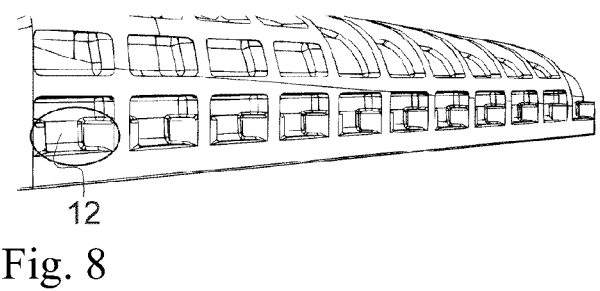
FIG. 7 a perspective view of a portion of a collector according to the prior art.

As already pointed out, FIG. 6 shows the overhanging configuration of the platform 18, which is abutted by the opening edge 26 particularly reliably and with a particularly large surface area. The region of the collector 10 comprising the numerous recesses 12 can also be referred to as the "foot". It is particularly clearly apparent from FIG. 6 (and FIG. 5) that the tube sheet 16 with the described band extends essentially parallel to the lateral edge of the collector (perpendicular to the plane of the drawing in FIG. 6) and is bent essentially in a U-shape underneath the described foot of the collector. According to FIG. 6, in the case of a heat exchanger with numerous tubes, the flat area (not shown), which comprises numerous openings into which fluid tubes open, can connect thereto on the left side.

Alternatively, in the case of a plate heat exchanger, with the "body" of said heat exchanger having a plurality of plates between which fluid flows, the header can be connected to said body in various ways.

The invention relates to a collector of a heat exchanger for a vehicle and to such a heat exchanger.

In heat exchangers which have numerous parallel tubes through which a fluid flows, the connection between the collector and a tube sheet is often a critical point. The tube sheet typically has numerous openings into which the numerous parallel tubes open. The fluid can be air, for example, that is cooled in the heat exchanger, which then acts as a charge air cooler. The tubes described open into a space formed by the tube sheet and the collector such that the air is "collected" there.

Alternatively, in heat exchangers which have numerous plates, a header or head plate is provided between the collector and the plates. The plates, between which a fluid flows, are not necessarily connected to the header. It should already be mentioned at this point that the invention can also be applied to such a header or head plate and that, at all places where a tube sheet is mentioned, a header or head plate is equally meant.

The collector and tube sheet are usually connected by means of a crimp connection, in which portions of the tube sheet are pressed into recesses in the collector. The described crimp connection can constitute a weak point since the pressure of charge air, for example, increases with the further development of engines, and since it is moreover considered to integrate the charge air cooler into the air diffuser as a structural element. This also leads to greater strains on the crimp connections.

The invention claimed is:

1. A collector of a heat exchanger for a vehicle, the collector comprising:
a plurality of recesses for a plurality of projections on a tube sheet or a header that are pressed into the recesses as part of a crimp connection between the tube sheet or the header and the collector, wherein each of the recesses has at least one platform which is spaced apart from at least one edge of the recesses in such a way that a free space is created, wherein the plurality of projections on the tube sheet or the header is disposed in an edge of the tube sheet or the header that is directed towards the collector to form the crimp connection between the tube sheet or the header and the collector, and wherein at least one opening edge, which is adjacent to an opening edge that is directly adjacent to the projections, is at an angle with respect to a vertical axis, wherein the at least one platform overhangs one lateral edge of the collector.

2. The collector according to claim 1, wherein, next to the at least one platform, a bottom of each of the recesses rises in a direction of a level of the at least one platform.

3. The collector according to claim 1, wherein at least one lateral edge of each of the recesses next to the at least one platform or next to the free space is formed in a curved manner.

4. A heat exchanger for a vehicle, the heat exchanger comprising:
a tube sheet or a header with a plurality of projections that adjoin openings and are pressed into recesses of a collector, wherein each of the recesses has at least one platform, wherein at least one opening edge, which is adjacent to an opening edge that is directly adjacent to the projections, is at an angle with respect to a vertical axis and bent out of a plane of the openings, and wherein the plurality of projections on the tube sheet or the header is disposed in an edge of the tube sheet or the header that is directed towards the collector to form the crimp connection between the tube sheet or the header and the collector, wherein the at least one platform overhangs one lateral edge of the collector.

5. The heat exchanger according to claim 4, wherein the edge of the tube sheet or the header that is directed towards the collector has further projections between the projections each adjacent to one of the openings.

6. The heat exchanger according to claim 5, wherein the edge of the tube sheet directed towards the collector is cut in, deepened or recessed next to the plurality of projections.

7. The heat exchanger according to claim 4, wherein the at least one opening edge adjacent to the adjacent opening edge which is directly adjacent to the plurality of projections are essentially parallel to each other.

8. The heat exchanger according to claim 4, wherein the tube sheet or the header has a serpentine or undulating form when viewed in a direction of the plane of the openings.

9. The heat exchanger according to claim 4 with the collector according to claim 1.

10. A collector of a heat exchanger for a vehicle, the collector comprising:
a plurality of recesses for a plurality of projections on a tube sheet or a header that are pressed into the recesses as part of a crimp connection between the tube sheet or the header and the collector, wherein each of the recesses has at least one platform which is spaced apart from at least one edge of the recesses in such a way that a free space is created, wherein the at least one platform overhangs one lateral edge of the collector, and wherein the plurality of projections on the tube sheet or the header is disposed in an edge of the tube sheet or the header that is directed towards the collector to form the crimp connection between the tube sheet or the header and the collector.

* * * * *